(12) United States Patent
Koo et al.

(10) Patent No.: US 6,901,447 B2
(45) Date of Patent: *May 31, 2005

(54) EVENT DRIVEN COMMUNICATION SYSTEM

(75) Inventors: Richard Koo, Redwood City, CA (US); Dale Skeen, Palo Alto, CA (US); Alexander Siegel, Sunnyvale, CA (US)

(73) Assignee: Vitria Technology, Inc., Sunnyvale, CA (US)

( * ) Notice: Subject to any disclaimer, the term of this patent is extended or adjusted under 35 U.S.C. 154(b) by 143 days.

This patent is subject to a terminal disclaimer.

(21) Appl. No.: 10/218,483

(22) Filed: Aug. 15, 2002

(65) Prior Publication Data

US 2002/0194347 A1 Dec. 19, 2002

Related U.S. Application Data

(63) Continuation of application No. 08/818,355, filed on Mar. 17, 1997, now Pat. No. 6,704,785.

(51) Int. Cl.⁷ ................................................. G06F 15/16
(52) U.S. Cl. ....................................................... 709/227
(58) Field of Search .................................. 709/223–229, 709/233, 201, 219, 202, 205, 312, 231; 707/103; 713/201; 379/88; 345/733; 370/466

(56) References Cited

U.S. PATENT DOCUMENTS

| | | | |
|---|---|---|---|
| 5,187,787 A | | 2/1993 | Skeen et al. |
| 5,257,369 A | * | 10/1993 | Skeen et al. ................. 709/312 |
| 5,295,139 A | | 3/1994 | Palmer |
| 5,557,798 A | | 9/1996 | Skeen et al. |
| 5,649,105 A | | 7/1997 | Aldred et al. |
| 5,699,365 A | | 12/1997 | Klayman et al. |
| 5,712,980 A | | 1/1998 | Beeler et al. |
| 5,768,528 A | * | 6/1998 | Stumm ........................ 709/231 |
| 5,793,365 A | | 8/1998 | Tang et al. |
| 5,794,039 A | * | 8/1998 | Guck .......................... 707/103 |
| 5,815,663 A | * | 9/1998 | Uomini ....................... 709/219 |
| 5,819,032 A | | 10/1998 | DeVries et al. |
| 5,844,553 A | * | 12/1998 | Hao et al. ................... 345/733 |
| 5,873,084 A | | 2/1999 | Bracho et al. |
| 5,913,032 A | | 6/1999 | Schwartz et al. |
| 5,913,041 A | * | 6/1999 | Ramanathan et al. ....... 709/233 |
| 5,919,247 A | | 7/1999 | Van Hoff et al. |
| 5,931,900 A | * | 8/1999 | Notani et al. ............... 709/316 |
| 5,935,210 A | * | 8/1999 | Stark ......................... 709/224 |
| 5,946,399 A | | 8/1999 | Kitaj et al. |
| 5,995,999 A | | 11/1999 | Bharadhwaj |
| 6,005,561 A | | 12/1999 | Hawkins et al. |
| 6,012,050 A | | 1/2000 | Eaton et al. |
| 6,012,083 A | * | 1/2000 | Savitzky et al. ............ 709/202 |
| 6,067,568 A | * | 5/2000 | Li et al. ..................... 709/223 |
| 6,128,315 A | * | 10/2000 | Takeuchi .................... 370/466 |
| 6,233,318 B1 | * | 5/2001 | Picard et al. ................. 379/88 |
| 6,240,444 B1 | * | 5/2001 | Fin et al. .................... 709/205 |
| 6,279,112 B1 | * | 8/2001 | O'Tool, Jr. et al. ......... 713/201 |
| 6,594,692 B1 | * | 7/2003 | Reisman ..................... 709/219 |
| 6,704,785 B1 | * | 3/2004 | Koo et al. ................... 709/227 |

OTHER PUBLICATIONS

Felber et al, The Design of a CORBA Group Communication Service, IEEE 1996.*

Rich Salz, News/mail gateway package, 1991; http://groups.google.com/groups?q=%22news/mail+gateway%22&start=10&hl=en&lr=ie=UTF–8&selm=4139%40litchi.bbn.com&rnum=15.*

Yourdon, Java, the Web, and Software Development, IEEE 1996.*

* cited by examiner

*Primary Examiner*—Thong Vu
(74) *Attorney, Agent, or Firm*—Nixon Peabody, LLP; Marc S. Kaufman

(57) ABSTRACT

A publish-subscribe communications system having a plurality of channels for transmitting data furnished by publishers of data to subscribers to data, each channel accepting data published to the channel and furnishing the data accepted to subscribers to the channel, a channel including facilities for accepting data for transmission by the channel from another channel.

17 Claims, 5 Drawing Sheets

EVENT DRIVEN COMMUNICATION SYSTEM

BACKGROUND OF THE INVENTION

1. Field of the Invention

This invention relates to information-sharing systems and, more particularly, to methods for defining software channels for event-driven communication systems.

2. Description of the Related Art

In computer systems, information may be shared in various ways. Information may be placed in a file, and users may share that file; information may be placed in a database, and users may share the information in the database. Such operations are sometimes referred to as resource-based operations because it is necessary for a user to obtain the information by accessing the resource which stores the information and obtaining whatever is needed. Information may also be shared through communications-based operations. Users may communicate a demand for information to an information source which utilizes a program to obtain and furnish the desired information to the user. Alternatively, information sources may publish information which may be utilized by subscribers which connect to a software channel defining resources and protocols for connecting to the channel.

All of these forms of information transfer are useful, but only the first three have been widely used. Each of these first three forms of information transfer poses certain problems which complicate its use. Any sort of resource-based communication requires that a user know what information it desires, know when it desires the information, be able to establish a connection to the source of information, and be able to retrieve the information. Often a user does not know that new information exists and sometimes only acquires knowledge of its existence after its value has diminished. Establishing a connection is often quite difficult, especially when the computer systems of the user and the source differ, because it requires a knowledge of esoteric formats and interconnection protocols. Retrieving information also requires that the user establish a complete one-to-one connection with the data resource, a requirement which increases network loading. A demand-based communication has most of the same problems although it may provide information which a user does not know exists.

Communications in which data regarding events are published to subscribers in response to the occurrence of the events ("event-driven" or "publish-subscribe" communications) are able to resolve these problems and are, consequently, very attractive for many purposes. Event-driven communications are especially useful, for example, where timely information dissemination is required, where notice of changes or status must constantly occur, where real time information monitoring and real time decisions are required, and in many other situations. In all of these situations it is necessary for a user in a resource or demand-based communication system to know of the occurrence of an event in order to access a resource or to demand the information desired. Even though especially attractive for many purposes, event-driven communications have found much less use than the other forms of communication.

Typically, when discussing event-driven or publish-subscribe communications, the term "publisher" is used to describe a data source such as a software program that sends information to a communication channel. The term "subscriber" is used to describe any type of software program or other device (such as a business application running on a large computer or a GUI-based application running on a personal computer) that receives information from a communication channel. Event-driven communications offer a number of advantages in addition to providing essentially immediate data when an event creating the data occurs. Event-driven communications reduce traffic below the level typically required by resource-based or demand-driven communication systems. Unlike these systems, publication of data to subscribers requires no explicit action by a subscriber in order to receive the data. Moreover, a publication of data to subscribers requires only a single publication from a publishing source to a channel no matter how many subscribers are to receive the data. The resources provided to implement any individual channel take care of the delivery of data to the individual subscribers once the publication has been received by the channel. A failure by a publisher, of course, requires retransmission from the publisher; and any guaranteed level of delivery may require a retransmission if a subscriber fails to receive published data. However, the overall affect is a significant reduction in traffic and, consequently, in expense.

Another advantage of publish-subscribe communication systems is that they function with both multiple subscribers and multiple publishers. Thus, a channel may receive data from a number of publishers and make the data available to a plurality of subscribers.

Publish-subscribe communications are asynchronous and thus allow a publisher or a subscriber to be on-line as it desires. Thus, a failure of equipment used by a subscriber has no effect on the service. The publication by a publisher simply continues, and other subscribers desiring to do so remain on line with no indication that any other subscriber has left. This emphasizes another great advantage of a publish-subscribe communications service, the manner in which the individual publishers and subscribers are decoupled from one another. In theory, apart from system administrators, no publisher or subscriber need know that any other publisher or subscriber is publishing or receiving data on any publication channel.

Because of these and other advantages, much work has been done to implement event-driven communications utilizing the various data access protocols which exist to facilitate the transfer of data between disparate systems. For example, in order to utilize the advantages offered by object-based software, the Object Management Group (OMG) has published a "Common Object Request Broker: Architecture and Specification" (CORBA), Version 2, July 1995, which defines a number of protocols useful for establishing communications of various types including event-driven communications utilizing various software objects. The CORBA architecture defines a framework in which software objects from various systems can integrate. A CORBA naming service specification outlines protocols for naming objects in a scaleable fashion for global communication systems. A CORBA event service specification describes protocols which define objects that function as publication channels on which event-driven data may be carried, define the manner in which publishers may publish on those channels, and delineate how users may subscribe to such channels to obtain published information.

By adhering to established data access protocols and the CORBA naming and event service protocols, it is possible to utilize object-based software to implement publish-subscribe communication systems which make it easy for a user to acquire data at a time when it is most useful. The use of these protocols allows the burden of overcoming interfacing problems and establishing communication channels to be transferred from the user and placed on the implementation of the channels. All that is needed once such a system is established is that a publisher and a subscriber agree on a format for the data being exchanged and little more. The user may ignore most of the interface requirements for establishing communication using prior art techniques and simply receive the data. The channels provide the resources for assuring that the various interfacing difficulties are overcome.

U.S. Pat. No. 5,187,787, issued to Skeen et al, describes apparatus and methods for establishing one form of basic publish-subscribe information exchange between different processes where the information may be of different formats and processes may be running on different computers.

Even with all of its advantages and the extensive work which has been accomplished, publish-subscribe communication systems still pose a number of problems which have not been solved by the prior art. A general problem involves the various details of implementing such an event-driven communication system. Another major problem is that in prior art embodiments such as that described in the Skeen patent the publication of data to a large number of subscribers requires a very large channel fanout from some central publication source. In a wide geographic region such as a continent, such a fanout requires a very large amount of expensive physical equipment. To support unlimited access by a significant number of publishers and subscribers requires the facilities and switching capabilities normally associated with a large telephone system. Such facilities are obviously impractical to all but a very few organizations. For this reason, the numbers of channels available tend to be somewhat limited and the channels used to carry a multitude of varying information much of which may not be useful to, or even should be kept from, the majority of users.

SUMMARY OF THE INVENTION

It is an object of the present invention to provide an improved publish-subscribe communications architecture.

This and other objects of the present invention are accomplished by a publish-subscribe communications system comprising a plurality of channels for transmitting data furnished by publishers of data to subscribers to data. Each channel includes a mechanism for accepting data published to the channel and furnishing the data accepted to subscribers to the channel. At least one channel includes a mechanism for accepting data for transmission by the channel from another channel as a publisher.

BRIEF DESCRIPTION OF THE DRAWINGS

These and other features of the invention will be better understood by reference to the detailed description which follows taken together with the drawing in which.

DETAILED DESCRIPTION

Figure 1:
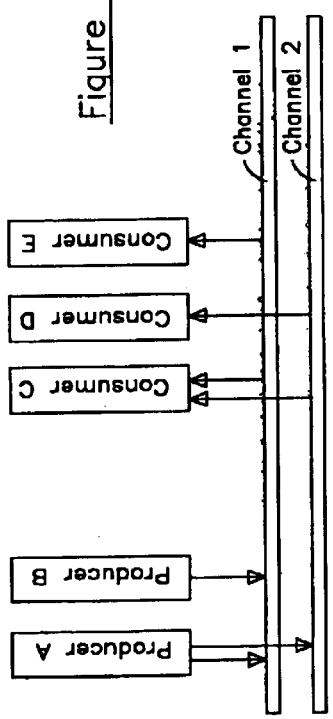
FIG. 1 is a diagram illustrating a conventional publish-subscribe communication service.

FIG. 1 illustrates an architecture for event-driven communications based on the Event Service Standard published as a part of the CORBA specification by the Object Management Group (OMG). According to the CORBA specification, a software channel is used to communicate related data to a common set of subscribers. Publishers may publish on more than one channel, and subscribers may subscribe to more than one channel. The specification allows new channels to be created dynamically and publishers and subscribers to be added dynamically to a new or existing channel. In FIG. 1, a pair of channels (channel 1 and channel 2) for publication of data are illustrated. A first publisher of data (publisher A) publishes data on both of the pair of channels 1 and 2. A second publisher of data (publisher B) publishes data on only channel 1 of the pair of channels. A first subscriber C receives data on both of channels 1 and 2. A second subscriber D receives data only on channel 2. A third subscriber E receives data only on channel 1. Each publisher and subscriber can have an associated device such as a personal computer, server, handheld device, computer network, or the like for transmitting or receiving data.

The architecture of FIG. 1 allows a one-time publication of data by a publisher to reach a number of different subscribers. Once published to a channel, the resources dedicated to the channel attend to delivery of the data to each of the individual subscribers. The CORBA event specification does not specify, however, how a channel is to be created nor the details of the channel structure by which data is accepted from a publisher and published to individual subscribers. The architecture described is especially adapted to allow information from a number of publishers to be placed on a single channel available to all subscribers to that channel; alternatively, a single publisher may furnish data to a single channel. Thus, the specification allows channels to be tailored to carry information important to certain groups of subscribers. This architecture also allows and furthers the anonymous publication and reception of data. Any publisher or subscriber may be connected and publishing or receiving data, or disconnected and attending to other business. None of the publishers or subscribers need know of others on the channel. Only a system or channel administrator need know the publishers and subscribers on any channel. A channel administrator as used herein is a person responsible for system administration tasks associated with an event service including among other things starting and stopping the event service program, creating channels, establishing data retention policies, and maintaining access control lists.

The system defined by the CORBA event specification provides an outline for event-driven communication systems. This outline leaves a large number of problems to be solved. Primary among these problems is the need to provide facilities to produce and administer the defined channels in an efficient and economic manner. Another especially important problem is posed by the need for all subscribers to the data furnished by a publisher on a channel to be directly joined to that channel in order to receive the data. When a large number of subscribers are connected to a channel, line loading problems can slow the transfer of data drastically and ultimately render the channel inoperative. The alternative of a publisher publishing on a large number of channels each of which hosts a smaller number of subscribers can be very expensive in terms of hardware since physical connections to carry the data must actually exist. Some of those physical connections are slow and expensive. For example, connections transferring data between continents fall into this category. A fanout from a publisher on one continent to subscribers on other continents can render the cost impractical.

The preferred embodiment eliminates many of the problems which the prior art has been unable to overcome. The preferred embodiment leverages the separate protocols of the CORBA naming specification and the CORBA event service specification in order to facilitate event-driven communications. An event-driven communications system may be significantly enhanced in accordance with the present invention by including resources which allow the use of a naming system and by extending the naming system to include the naming of channels. Combining a naming system with an event-driven communications system allows channels to be named in a manner to indicate the content of the information provided on the channels and allows such names to be assigned by naming services associated with computers implementing event services at widely dispersed points in the system which includes the channels. The naming protocols utilized may support the federated naming provided by the CORBA naming specification so that the namespace of each portion of a system may be seamlessly integrated into a larger global namespace and provide a logically understandable communications network. Thus, typically, the naming system uses multi-part, hierarchically structured, human-readable names similar to those used by computer-based file systems and the World Wide Web.

Figure 2:
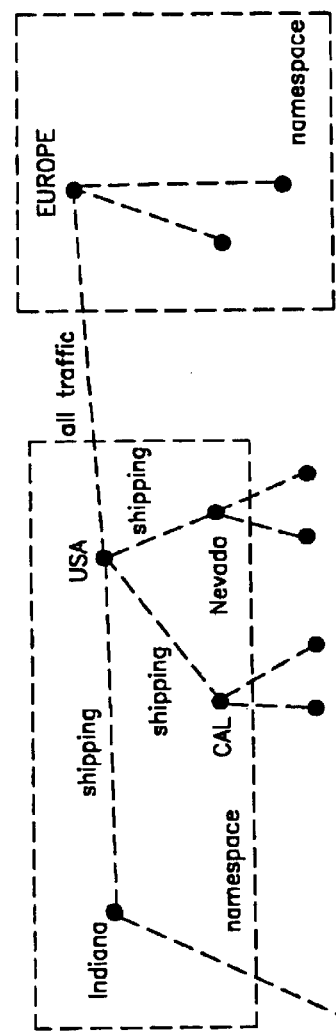
FIG. 2 is a diagram illustrating a naming convention utilized in the preferred embodiment.
Figure 2:
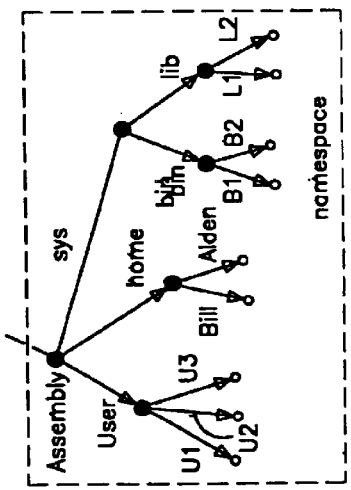

For example, in one computer system illustrated in the solid line portion of a naming graph illustrated in FIG. 2, a user U1 might utilize an address such as "/sys/bin/B2" to reach a location B2. For a user U1 to connect to the point B2 in the communication system requires traversing the path defined above from the user's communication connection to the other point. The computer system shown in solid lines may be a computer file system used to process shipping information within a unit called "assembly" (designating an assembly plant) of a larger system (shown in dotted lines) which includes a portion headquartered in "Indiana," another portion headquartered in "California," and a portion headquartered in "Nevada," all of which are part of a "USA" hierarchy. Another hierarchy may be located in "Europe" having similar divisions. As may be seen, each of the portions may be joined by channels named "shipping" chosen to carry information related to product shipping with respect to each portion. Separate channels (not shown) may carry other data between the same and other portions of the system. The channel communication system of the present invention is especially adapted to utilize such a naming protocol to enhance an event-driven communications system.

Figure 3:
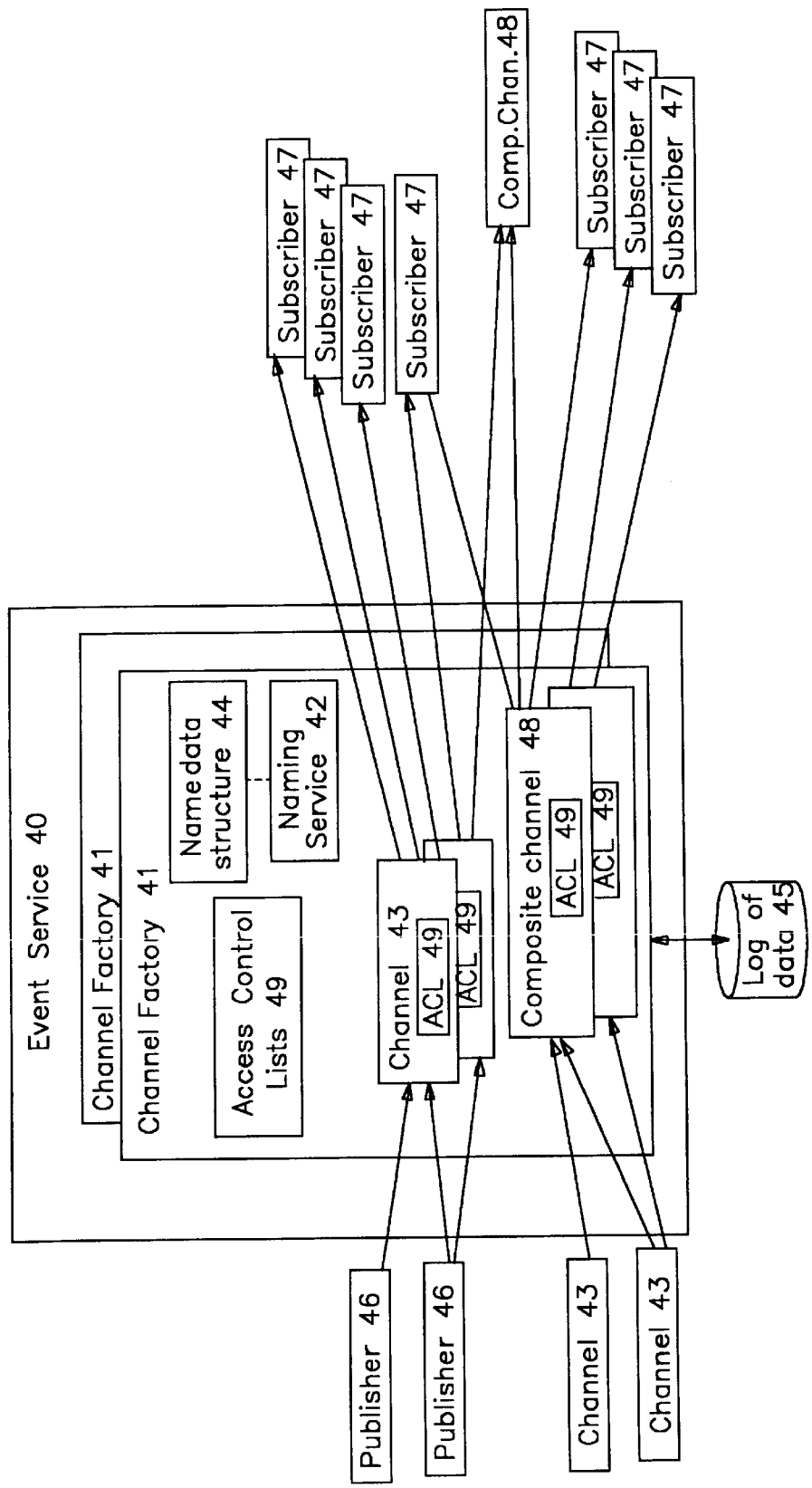
FIG. 3 is a diagram illustrating a publish-subscribe communication service architecture in accordance with the preferred embodiment.

FIG. 3 is a diagram illustrating an improved architecture in accordance with the preferred embodiment of the present invention which greatly reduces the expense of publish-subscribe communications and provides means for efficient administration. The basic structure of the architecture can conform to the CORBA event-service specification and provides channels on which publishers publish data and subscribers receive data. The architecture combines the publish-subscribe concept with the CORBA naming-service concept to enhance its operation.

The preferred embodiment provides computer implemented software programs referred to as "event services" 40 which include "channel factory objects" 41 for creating and administering the channels 43. Channel factory objects 41 are software objects which may be programmed utilizing an object oriented language. The use of such a programming language allows the data and the processes utilizing the data to be included as objects which may be called upon to accomplish certain functions. The channel factory objects 411 include methods by which a publish-subscribe communication system may be implemented. For example, the channel factory objects 41 are programmed with methods which allow the creation and naming of new channel objects which establish the various interfaces and allocate the resources used to implement the publish-subscribe architecture. The channel objects which may be created include both "basic channels 43" and "composite channels 48." Channels 43 and 48 can also be in the form of objects. Consequently, the channel factory objects include methods by which the channels may be generated as both "basic channels" and "composite channels." A channel factory object 41 can include a method for creating additional channel factory objects 41 so that the control hierarchy within an event service may be simplified. The method for creation of a basic channel factory object 41 includes processes by which, each time an event service is set up, a separate basic channel is also created for providing status data to publishers and subscribers to channels utilizing channel factory object 41 at that event service.

Other methods on a channel factory object 41 may provide a channel capable of allocating resources for providing storage and other facilities in addition to that of basic channels to allow retention policies to be implemented by which various levels of service ranging from a basic "best efforts" service through various levels of "guaranteed delivery" may be offered. In one embodiment, the channel factory objects include methods by which the channels may be generated as "reliable channels" and as "guaranteed channels" in order to carry this out. The channel factory objects also include methods for deleting channels, for creating and deleting "naming contexts" (subdirectories of names), for providing alias names for channels, and for moving channels from one context to another.

A channel factory object 41 provides access control by establishing access control lists for the channels it creates. Some of the rights of access provided to aid administration in one embodiment include the right to establish naming directories, to delete assigned names, to create or delete a new channel, and to create or delete an alias name for a channel. Other administrative functions include the right to list subscribers and publishers, to list the names of named subscribers and the last event for each subscriber, to determine channel statistics regarding events, and to obtain a reference to the channel factory which created the channel and to the log of events for that channel.

In FIG. 3, a pair of channel factory objects 41 are shown. In this embodiment, each channel factory object 41 includes a naming service 42 which allocates names available to that channel factory and maintains a name data structure 44 in which the names assigned by the associated channel factory 41 may be recovered. Channel factory objects 41 are used to create and administer channels 43, composite channels 48, and additional channel factory objects 41. In this discussion regarding creation, a reference to channels 43 includes composite channels 48 unless the context indicates otherwise. Each channel 43 created by the channel factory object 41 is assigned a unique name within the particular hierarchy level by the naming service 42. Each channel 43 is provided an access control list 49 in which access data may be stored by the channel indicating publishers 46 and subscribers 47 and the level of access for each. Typically, long term data storage such as a log for data 45 is provided to implement various levels of service which may be offered by the channels 43.

Because of the extensive use of the above-described naming protocols for control of the communications system, a channel factory object 41 provides a naming service 42 by implementing a naming service object and, consequently, having the attributes of such a naming service object. These naming service attributes allow a channel factory to accomplish the above-described control functions. For example, the naming methods of a channel factory object 41 may be utilized for creating and deleting names for channels. The naming methods also allow alias name assignment to channels as well as the addition and deletion of channels. The presence of these methods allows browsing and listing of assigned names stored in the name data structure 44 by a client having a sufficient level of access so that a system administrator may discover all of the channels created by a particular channel factory to which the administrator has the proper level of access.

When a channel 43 is created by an administrator having the required level of access, the channel factory object 41 names the channel 43, allocates all of the software and hardware resources necessary for that channel 43 to function in the manner in which it is defined at its creation, and establishes data structures to record the characteristics of the channel. The channel 43 is named in the manner described above. Each channel 43 created using the channel factory objects is responsible for maintaining its access control lists 49. The rights of access which may be granted to users in one embodiment are the right to publish on a channel, the right to subscribe to a channel at a particular level, the right to destroy a channel, and the right to perform administrative functions with respect to a channel. A channel is embued with certain attributes depending on the type of channel created. For example, the quality of service attribute classifies whether a channel is guaranteed or reliable. In one embodiment of the invention, a guaranteed channel provides persistent memory space by allocating resources (shown as "log of data" 45 in FIG. 3) for logging events (messages), while a reliable channel provides only memory space for events which does not persist after computer failures. Channel retention policy attributes define the maximum number of events a channel may hold as well as the duration during which a channel retains an event. If a subscriber has lost or terminated a connection to the channel, it may be guaranteed that data specified by the retention policy may be recovered when the connection is reestablished. The attributes of a channel are typically set when it is created by a channel factory object 41.

A channel 43 which has been created implements the publish-subscribe capabilities described above by accepting published messages from publishers, storing those published messages in memory, and delivering published messages to subscribers based on the assigned level of service. When a channel 43 is created, its maximum level of service is specified. This allows consumers of the data published to subscribe at any level offered up to the maximum of which the channel is capable. The channels 43 may be established as guaranteed channels which maintain a log 45 of pending guaranteed messages (which may be stored before being published to subscribers on the channel) so that a subscriber which has been off-line for some period can obtain those messages through a republication of data logged since that subscriber left the channel.

A channel 43 may support "named" subscribers and "unnamed" subscribers. To be named means that a subscriber registers its name with a channel when subscribing. The channel 43 maintains the state of a named subscriber, particularly state indicating the time at which a subscriber disconnected and the last message received by that subscriber, so that data which has been published may be recovered for that subscriber after an offline condition of the subscriber. To be unnamed means that a subscriber must maintain its own state (its last on-line event) and convey that state to the channel in order to recover data after an off-line condition. Any subscriber may suspend its subscription (e.g., so that it may access a different event service) at any time. The maximum time during which data retrieval is possible for such a suspension depends on the level of service subscribed to by the subscriber, the resources provided, and the retention policy of the particular channel.

Figure 4:
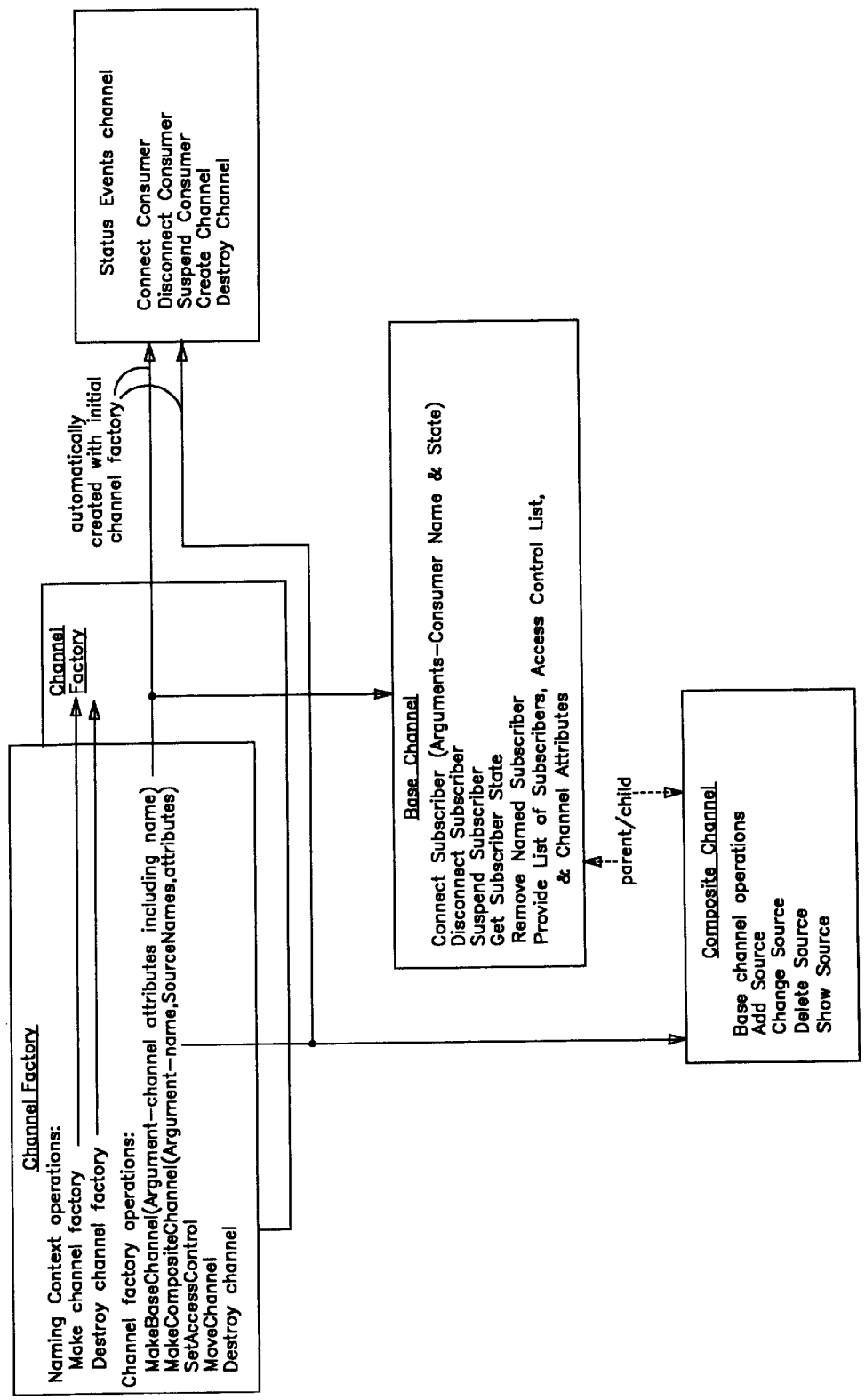
FIG. 4 is a diagram illustrating software components which may be utilized to establish a publish-subscribe communication service of the preferred embodiment.

The manner of implementing a publish-subscribe communication system in accordance with the present invention may be better understood with respect to FIG. 4 which diagrams the various objects of the architecture and their relationships. When the present invention is utilized in one embodiment, an administrator first utilizes the event service software 40 running on a computer where a new channel factory is to be located. This software includes at least one channel factory object 41. As has been outlined above, a channel factory object can be an implementation of a basic naming service object designed in accordance with the CORBA naming specification and including additional methods to allow the allocation of resources and provision of characteristics sufficient to provide the desired type of channel. Each channel factory object 41 should be associated with a naming service in order to accomplish its purposes. The use of the naming service object 42 allows the naming abilities to be achieved.

A channel factory object 41 may be used to create other channel factory objects 41. This is done by invoking a "create channel factory" method on the channel factory object 41. When a new channel factory is created, it is appropriately named by the naming service object 42 of the creating channel factory 41 so that it may be called to create individual channel objects. This newly-named channel factory object creates a hierarchical name space for the various channel objects it may create and sets up an access control list space 49 for each channel 43.

A channel 43 is created by looking up a particular channel factory object by name in the name data structure 44, invoking a "create channel" method on the channel factory object 41 which has been created, and naming the channel 43. The channel name is placed in the name data structure 44 associated with that channel factory object so that it may be retrieved for use. When a channel 43 is established, its maximum quality (level) of service is specified; and access control list 49 for the channel specifying publishers 46 and subscribers 47 is set up.

When the channel 43 is first used to publish data, a publisher 46 looks up the channel 43 by name and invokes a "publish" method on that named channel object. While invoking the publish method, the publisher 46 passes the appropriate data to be published to the channel. The data being published is appropriately stored using the resources assigned to the channel 43. The channel 43 then utilizes its resources to publish the data to any connected subscribers. A consumer receives the data which is being published by subscribing to the channel 43. The consumer looks up the channel object by name and receives a reference to the named channel object. The consumer invokes a "connect consumer" or "subscribe" method on the channel object and passes a reference (e.g., an address) for the subscriber which is to receive the data. Each time data is published on the channel, the channel uses the subscriber reference and passes the published data to that subscriber 47. Thereafter, a subscriber 47 may stop the subscription by invoking a "disconnect" or "suspend" method on the named channel object.

If a subscriber 47 has disconnected in the embodiment described, the subscriber may resubscribe and receive all of the data which it missed up to some prescribed amount determined by the retention policy of the channel. Presuming such data is available, the data is furnished from the point at which the last message was received by the subscriber.

One especially useful ability implemented by methods on a channel factory object is the ability to create both basic and composite channels. A basic channel is a channel such as those illustrated in FIG. 1 and FIG. 3 to which one or more publishers may be connected to publish data destined for one or more subscribers. A composite channel as the term is used herein refers to a channel which may receive data published on one or more other channels (either basic or composite). In one embodiment, the composite channel object class is a subtype of the basic channel object class which means that a composite channel object has the characteristics of a basic channel object. However, a composite channel may also include software for connecting to any channel designated as a publisher for that channel.

A description of a particular composite channel implementation is provided in the appendix to this specification.

Figure 5:
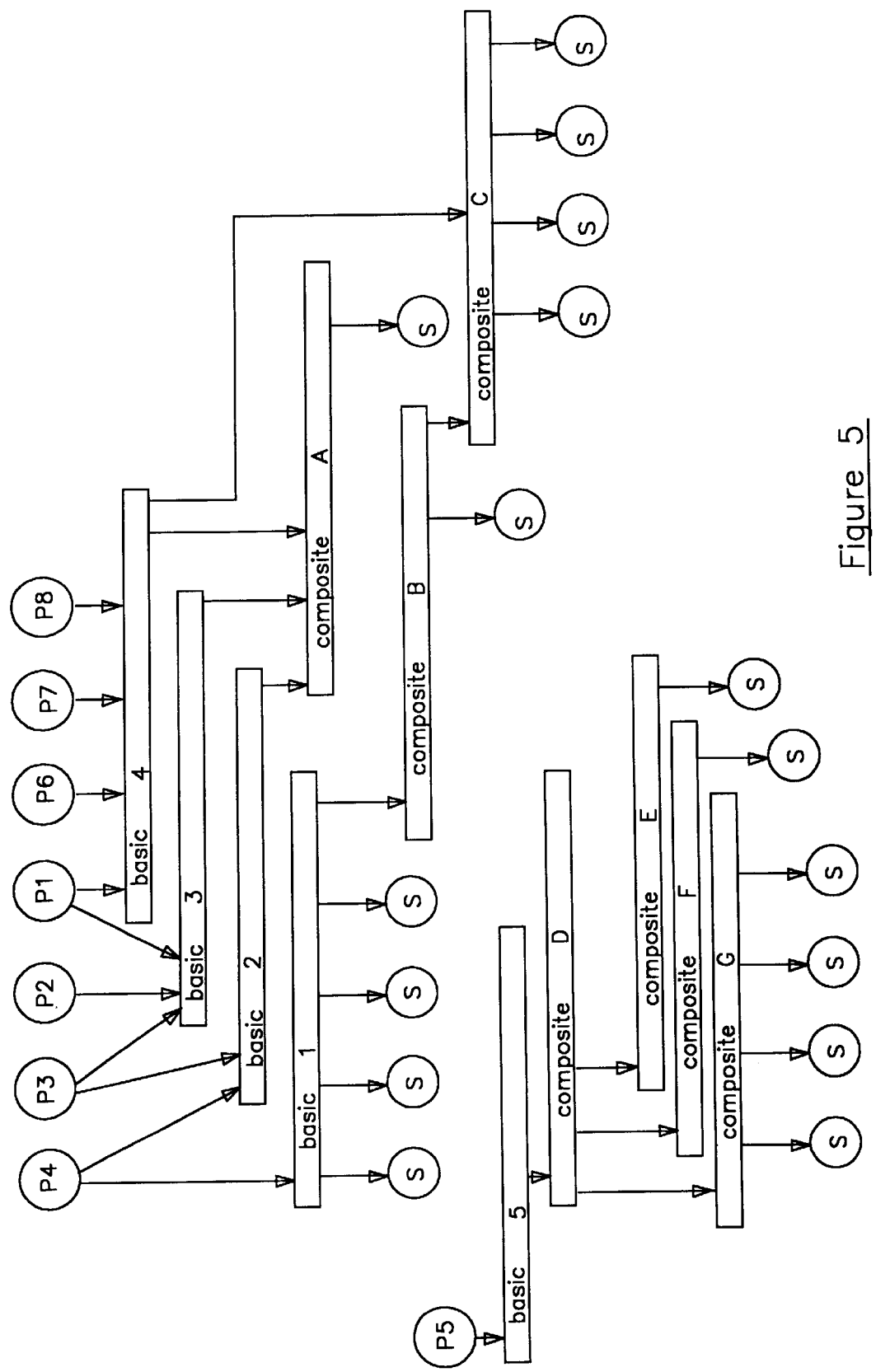
FIG. 5 is a diagram illustrating the architecture of primary and composite channels in a publish-subscribe communication service of the preferred embodiment.

FIG. 5 illustrates a number of composite channels A–G which carry data originally published on another channel. FIG. 5 attempts to demonstrate in a small amount of space a number of the great variety of different arrangements which are possible using composite channels; however, no attempt has been made to eliminate redundant publications or to show subscribers connected to all of the composite and basic channels as might be the case in a practical situation. A composite channel (such as composite channels E–G) may be established by an administrator, for example, to carry the publications of a single other channel (including a composite channel D). Any composite channel appears as a subscriber to the other channel upon which the data is originally published but carries all of the data which the original channel carries. Such a composite channel has its own characteristics determined when it is established. Thus, a composite channel may be a reliable channel while the original publishing channel is a guaranteed channel. The lack of guaranteed service on that composite channel means that logging facilities need not be maintained for the subscribers to the composite channel. This reduces the cost of furnishing services to the subscribers on the composite channel.

A plurality of composite channels such as composite channels D–G may be used to reduce the need for expensive network facilities to transfer data to a large number of subscribers. For example, assuming the situation described earlier where a plurality of subscribers are separated from a publisher by expensive networking facilities such as where a publisher and subscribers are on different continents, a single channel (e.g., basic channel 5) utilizing expensive hardware may be required to carry the data from the publisher to the other continent. A publisher need only publish data one time on the basic channel. At the other continent, a series of composite channels D–G utilizing less expensive physical equipment but carrying only data carried on that single original channel may be established. For example, a first of these channels D may subscribe to the basic channel 5; while composite channels E–G each subscribe to composite channel D. The resources of the composite channel D address and furnish the publication separately to each of the individual composite channels E–G. The composite channels E–G in turn address and furnish the publication to each individual subscriber S. These composite channels allow very inexpensive fanout after the point at which the expensive networking has been already transited. This greatly reduces the cost of communications as contrasted to prior art publish-subscribe communications.

A composite channel may be used to allow a much greater variety of data on channels without significant increase in expense. A composite channel (such as composite channels A–C) may subscribe to data from one or a large number of channels. This allows the data provided by the composite channels and the basic channels to be better tailored to suit the needs of subscribers S. For example, one basic channel may carry data from a first news service, a second basic channel may carry data from a second news service, and a third basic channel may carry data from a third news service. A number of composite channels may be established to carry data from any selection of the three different news services. This reduces the number of subscribers on the basic channels to only those which are interested in a single news service. It may also reduce the cost to the subscriber which is interested in more than one news service. Most importantly, it allows channels to be tailored very simply to subscribers.

Figure 6:
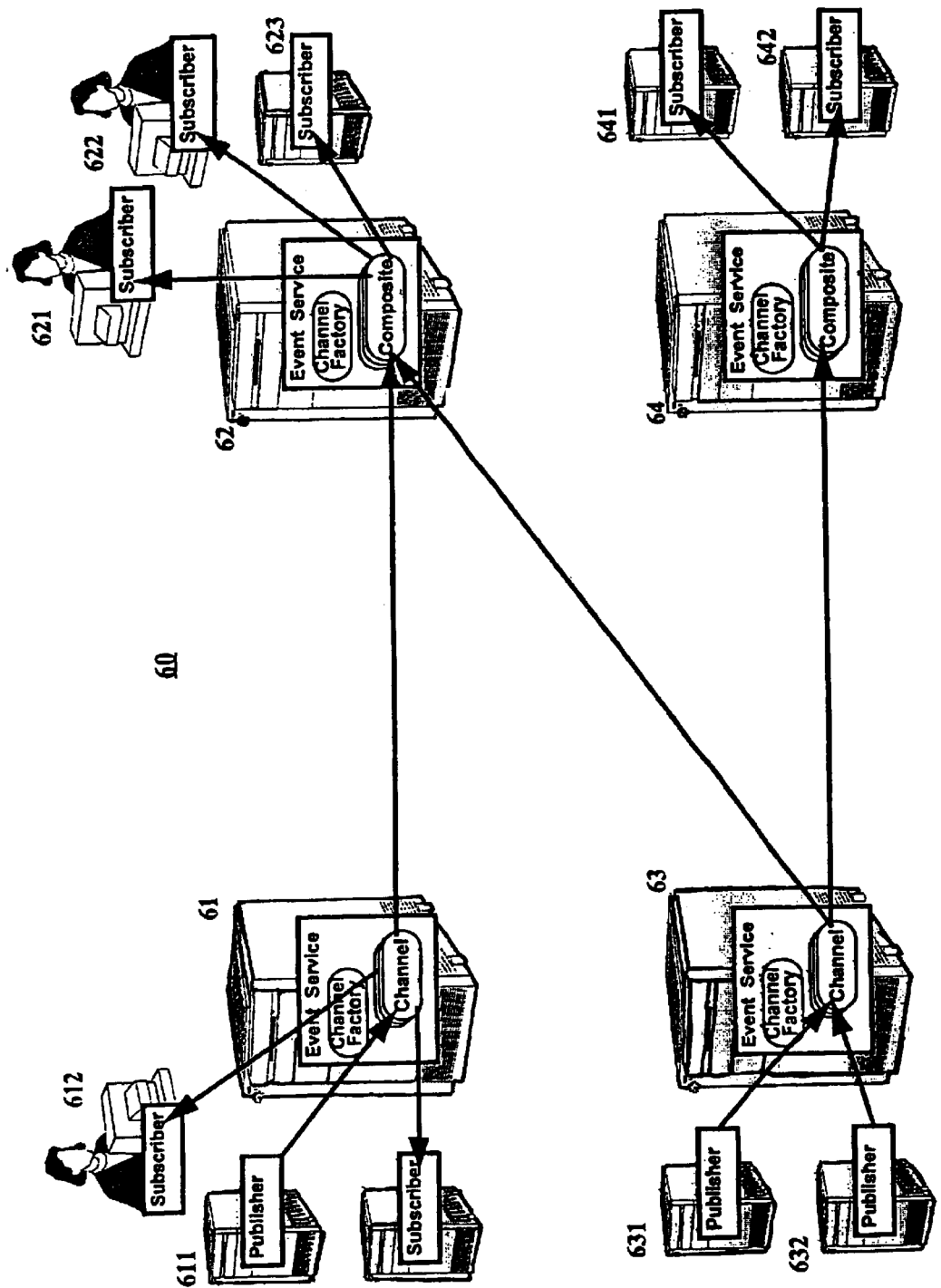
FIG. 6 is a diagram of a communication system of the preferred embodiment.

FIG. 6 shows a communication system 60 based on the present invention. The system 60 includes a number of computers 61–65 functioning as servers executing event service software to establish and maintain a plurality of channels in accordance with the present invention. Each event service includes at least one channel factory object for creating channels by which communications may be conducted between publishers and subscribers. The channels established by each channel factory are shown as both basic channels and composite channels; and any event service probably utilizes both types of channels.

The event service software executing on the computer 61 includes one or more channels connected to receive data from publisher software running on a computer 611 set up as a server and to publish data to a first subscriber at a desktop computer 612 and a second subscriber which is a computer 613 set up as another server. The channel illustrated at the computer 61 is shown publishing to a composite channel executing on the computer 62 also running event service software. The composite channel executing on the computer 62 also receives data published by a channel executing as a part of event service software running on the computer 63 set up as a server. Shown joined to one or more of the channels established by the event service software at the computer 62 are two subscribers at desktop computers 621 and 622 and a subscriber at a computer 623 set up as a server. A pair of computers 631 and 632 running as servers publish data to the channels at the computer 63.

The computer 64 is illustrated executing a composite channel as a part of the event service software. The composite channel receives data from a single basic channel executing on the computer 63 and thus replicates the data provided on that basic channel. This allow subscribers which are servers 641 and 642 to receive the same data as is furnished on the channel at the computer 63 to the subscribers on the composite channel at the computer 62. An advantage of this is that the fanout to subscribers is broader without increasing the hardware facilities.

A composite channel may act as an exact "replica" of a source channel in order to provide higher availability of the published information on the source channel. In this usage scenario, the composite channel subscribes to exactly one source channel. Acting in this capacity, the composite channel replicates the information on the single source channel. A consuming application may subscribe to either channel, the source channel or the composite channel acting as a replica. In the event of a failure, the consuming application can resubscribe to the other channel and resume information delivery from the point at which the failure occurred. For example, the composite channel at the computer 64 subscribes to exactly one source channel at the computer 63. Acting in this capacity, the composite channel replicates the information on the single source channel. In a related usage situation, both a source channel and a replica composite channel are available to a channel subscriber. A subscriber may subscribe to either channel, the source channel or the composite channel acting as a replica. In the event of a failure, the consuming application can resubscribe to the other channel and resume information delivery from the point at which the failure occurred. A single source channel may have multiple replica channels, and the number of replica channels per source channel is unlimited. Morever, a replica channel can act as a source channel to other replicas.

In the preferred embodiment of the invention, the switchover from a source channel to a composite channel acting as a replica can be accomplished without lose or duplication of published information. This is accomplished as follows. Each message published on a channel is consecutively numbered. This number is referred to as the "event identifier." Hence, a subscriber may check for message duplication or message loss on a channel by remembering the event identifier of the last message received on the channel and comparing the event identifier against the event identifier of each new message received on the same channel. Typically, a composite channel acting as a replica preserves the original event identifiers. Hence, a subscriber will see the same event identifier associated with the same message regardless of whether the message was received from the original source channel or from the composite channel. When a subscriber switches from the source channel to the composite channel, or vice versa, the subscriber need only remember the event identifier of the last message received and then present this event identifier to the channel when resubscribing. The channel will then send the subscriber messages starting with the next event identifier.

A related use of composite channels is for disseminating information to different security or administrative domains. Each domain can set up a separate composite channel to handle information dissemination within the domain and to insulate the domain from information dissemination in other domains. Thus, while the servers 641 and 642 receive the same data as is furnished on the base channel at the computer 63 to the subscribers on the composite channel at the computer 62, the channels may offer different levels of service. A domain may choose to insulate itself for reasons of performance, fault-tolerance, resource allocation, or security. For example, a mission-critical suite of subscribers may require a certain level of performance. By configuring a separate composite channel on dedicated hardware for those consumers, the desired performance level can be assured without competition from non-mission-critical subscribers. Similarly, corporate subscribers can use composite channels that are configured with larger disks or with RAID disks to ensure a higher level of fault-tolerance; whereas, departmental subscribers may use smaller less expensive disks. The different "domains" illustrated in these examples may or may not be formally defined domains with separate administrative services.

Composite channels allow the dissemination of information to separate security domains. A composite channel may be configured for each distinct security domain and have the responsibility for access control within the domain. Specifically, a composite channel for a given domain manages the access control list (ACL) for subscribers within that domain. The source channel need only authenticate and authorize the composite channel, not each of the individual subscribers. This significantly reduces the security administration in the source channel's domain. A source channel can preclude selected security domains from defining composite channels and republishing its information by not authorizing the event service instances in the selected domains.

The composition of a composite channel can be changed by a system administrator at any time. By that it is meant that a source channel may be added to or deleted from a composite channel while there are publishers and subscribers actively connected to the composite channel. The channel will connect to new source channel or disconnect from deleted source channel accordingly. This enables a dynamic change to the mix of information carried by a composite channel to meet either administrative or application needs in a manner that is transparent to the subscribers of a composite channel.

Although the present invention has been described in terms of a preferred embodiment, it will be appreciated that various modifications and alterations might be made by those skilled in the art without departing from the spirit and scope of the invention as defined by the appended claims.

- 25 -

A. <u>Appendix:</u>

B. <u>Composite Channel IDL Definition</u>

Composite channel definitions are included below in OMG CORBA IDL syntax.

```
interface ConsumerNotifier {
    oneway void Suspend(in BaseChannel channel);
};

struct ConsumerInfo {
    Object consumer;
    ConsumerNotifier notifier;
};

interface BaseChannel { readonly attribute ChannelAttributes atts;

void Connect(in ConsumerInfo info);

void Disconnect(in ConsumerInfo info);

void Suspend(in ConsumerInfo info);
};

typedef sequence <CosNaming::Name> Nameseq;

interface CompositeChannel : BaseChannel { readonly attribute Nameseq sources;

void AddSource(in CosNaming::Name src);

exception NoSource {};

void DeleteSource(in CosNaming::Name src) raises (NoSource);
};

enum ServiceQuality { RELIABLE, GUARANTEED };

struct ChannelAttributes {
    ServiceQuality qual;  // channel quality of service
    long capacity;        // max # of events
    long agelim;          // event age limit
};

interface Factory : CosNaming::NamingContext {

BaseChannel MakeBaseChannel(in CosNaming::Name channame,
                in ChannelAttributes attr);

CompositeChannel MakeCompositeChannel(in CosNaming::Name channame,
                in Nameseq srcnames,
                in ChannelAttributes attr);
```

};

C.  Composite Channel Implementation Pseudo Code

A description of the composite channel implementation in pseudo code follows. The syntax of the pseudo code is patterned after C++.

```
// information about a composite channel source
//
struct CompChanSource
{
    CosNaming::Name srcname;  // source name
    BaseChannel chan;    // source object reference
    long long chanid;    // source channel id
    long long evid;      // id of event last received from source
}

// information about an event
//
struct EventInfo
{
    long long chanid;   // id of channel that publishes the event
    long long evid;     // event id
}

// composite channel implementation class inherits
// from the basic channel implementation class
//
class CompChanImpl : BaseChanImpl {
public:

// methods that are special to composite channel
    //
    void AddSource(const CosNaming::Name src);
    void DeleteSource(const CosNaming::Name src);

protected:

// override the following parent class methods
    //
    virtual void Initialize();
    virtual void CheckChanData(const EventInfo einfo);

private:

// methods internal to composite channel implementation
    //
    void ReconnectSource(CompChanSource s);
    void CheckSource();
    void VerifySources();
};
```

```
// initialize a composite channel
//
void
CompChanImpl::Initialize()
{
   this.BaseChanImpl::Initialize();
   reload the list of sources from the persistent store;
   foreach s on the list do {
      this.ReconnectSource(s);
   } if this is the first composite channel to initialize then
      start a new thread to run the method
         CompChanImpl::VerifySources;
}

// add another source to the composite channel
//
void
CompChanImpl::AddSource(const CosNaming::Name src)
{
   verify caller has access right;

if caller does not have requisite right, then
      raise AccessRightViolation exception;

CompChanSource s;
   s.srcname = src;
   s.evid = 0;

add s to the list of sources;

make persistent the new source list;

this.ReconnectSource(s);
}

// remove a source from the composite channel
//
void
CompChanImpl::DeleteSource(const CosNaming::Name src)
{
   verify caller has access right;

if caller does not have requisite right, then
      raise AccessRightViolation exception;

CompChanSource s = remove source with matching name;
   if not, raise NotFound exception;

make persistent the new source list;

// disconnect from that given source
   s.chan.Disconnect();
}

// connect to another channel
```

```
//
void
CompChanImpl::ReconnectSource(CompChanSource s)
{
   // resolve the source name
   s.chan = resolve(s.name);
   if resolution fails then return;

verify the resolved object is a channel;
   if verification fails then return;

// retrieve the channel id
   // the channel id will be used in the CheckChanData method
   s.chanid = s.chan.channelinfo();

// connect to source
   s.chan.Connect(s.evid);
}

// verify the source is alive.
//
void
CompChanImpl::CheckSource()
{
   foreach s on the source list do {
      s.chan.Ping();
      if the ping operation fails then
         this.ReconnectSource(s);
   }
}

// verify an incoming event is from a channel source
//
void
CompChanImpl::CheckChanData(const EventInfo einfo)
{
   long long chanid = einfo.chanid;
   Look for source, s, on the source list that matches chanid;
   if s is not found then raise BadEvent exception;

// save the new event id for subsequent reconnection
   s.evid = einfo.evid;
   make s persistent;

if this channel is a replica channel then
   preserve the evid in einfo;
     else
        reset the evid in einfo to a new event id;
}

// periodically, make each composite channel
// verify its connections to its sources.
void
CompChanImpl::VerifySources()
{
   do periodically {
      foreach composite channels, ch, do
```

```
        ch.CheckSource();
    }
}
```

- 29 -

What is claimed:

1. A publish-subscribe communications system in which data is published in response to events, said system comprising:
   at least one data source serving as a publisher of data in response to events;
   at least one subscriber; and
   a plurality of software channels for storing and transmitting data furnished by selected ones of said at least one data source to selected ones of said at least one subscriber, each of said software channels defining a software protocol specifying how data sources publish to the channel and how subscribers subscribe to the channel whereby data published to a channel is made available to all subscribers subscribing to that same channel;
   wherein at least a first channel of said channels defines a software protocol for accepting data from a second channel of said channels as a publisher.

2. A publish-subscribe communications system as claimed in claim 1 wherein each of the software channels is a named software object.

3. A publish-subscribe communications system as claimed in claim 2, wherein the named software object is named to indicate a characteristic of the data in the channel.

4. A publish-subscribe communications system as claimed in claim 1, wherein the protocol for accepting data from a second channel includes means for changing channels from which data is accepted dynamically.

5. A channel factory object for creating software channels within a publish-subscribe communications system in which data is published to channels in response to events, said channel factory object comprising:
   a software allocation method for allocating hardware and software resources for channels;
   a software protocol method specifying how data sources publish to channels and how subscribers subscribe to the channels whereby data published to a channel is made available to all subscribers subscribing to that same channel, said software protocol method including instructions for accepting data from a second channel as a publisher.

6. A channel factory object as claimed in claim 5, further comprising a software method for deleting a software channel.

7. A channel factory object as claimed in claim 5, further comprising a naming service operative to allocate names for channels created by the software channel object.

8. A channel factory object as claim in claim 5, further comprising an access control method for creating and managing access control lists of channels created by the channel factory object.

9. A channel factory object as claimed in claim 5 in which the software protocol method specifies that only channels are accepted as publishers to a created channel.

10. A channel factory object as claimed in claim 5, wherein the software protocol method includes a method for changing channels from which data is accepted dynamically.

11. A method for creating a software channel in a publish-subscribe communications system capable of executing event service software programs, said method comprising:
    allocating resources for accepting data published by publishers to the software channel; and
    specifying protocols for providing access to the software channel by publishers and subscribers, said protocols including protocols for providing access to the software channel by other software channels as publishers.

12. A method as claimed in claim 11 in which said step of specifying comprises specifying protocols providing access to the software channel only to publishers which are other transmission channels.

13. A method as claimed in claim 12, further comprising recording publishers and subscribers having access to the channel.

14. A method as claimed in claim 12 further comprising recording access rights of publishers and subscribers having access to the channel.

15. A method as claimed in claim 12, wherein said allocating step comprises allocating persistent storage resources to the software channel.

16. A method as claimed in claim 12, wherein said allocating and specifying steps are accomplished by a channel factory software object.

17. A method as claimed in claim 11, wherein the protocol for providing access to the channel by other software channels includes means for changing channels from which data is accepted dynamically.

* * * * *